United States Patent
Borges Oliveira et al.

(10) Patent No.: US 12,242,021 B2
(45) Date of Patent: Mar. 4, 2025

(54) AUTOMATIC WEATHER EVENT IMPACT ESTIMATION

(71) Applicant: International Business Machines Corporation, Armonk, NY (US)

(72) Inventors: Dario Augusto Borges Oliveira, Paraíso (BR); Bianca Zadrozny, Rio de Janeiro (BR); Campbell D Watson, Brooklyn, NY (US); Jorge Luis Guevara Diaz, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/559,507

(22) Filed: Dec. 22, 2021

(65) Prior Publication Data

US 2023/0194753 A1    Jun. 22, 2023

(51) Int. Cl.
*G01W 1/10*    (2006.01)
*G06N 3/04*    (2023.01)
(Continued)

(52) U.S. Cl.
CPC .............. *G01W 1/10* (2013.01); *G06N 3/04* (2013.01); *G06N 7/01* (2023.01); *H04W 4/90* (2018.02)

(58) Field of Classification Search
CPC ........... G05B 2219/33002; G05B 2219/37205; G05B 2219/33303; G11B 20/10287; G11B 20/10379; G05D 1/0088; G01W 1/10; G01W 2001/006; G01W 1/02; G06N 7/01; G06N 3/04; G06N 3/047; G06F 30/27; G06F 16/212; G06F 16/3346;
(Continued)

(56) References Cited

U.S. PATENT DOCUMENTS

| 5,926,401 A | 7/1999 | Montag |
| 7,200,491 B1 | 4/2007 | Rose, Jr. |

(Continued)

FOREIGN PATENT DOCUMENTS

| CN | 104635637 A | 5/2015 |
| CN | 103810537 B | 9/2016 |

(Continued)

OTHER PUBLICATIONS

Abbot, J., Marohasy, J. Application of artificial neural networks to rainfall forecasting in Queensland, Australia. Adv. Atmos. Sci. 29, 717-730 (2012). https://doi.org/10.1007/s00376-012-1259-9. (Year: 2012).*

(Continued)

*Primary Examiner* — Daniel R Miller
*Assistant Examiner* — Eric Sebastian Von Wald
(74) *Attorney, Agent, or Firm* — Anthony M. Pallone (57) ABSTRACT

A processor may receive weather event data. The processor may determine, utilizing an artificial intelligence model mapping weather events having weather impacts with a higher likelihood of occurrence proximate to each other in the latent space, a weather impact associated with a weather event. In some embodiments, the artificial intelligence model may be trained using historical weather event data and historical weather impact data associated with the historical weather event data. The processor may output the weather impact associated with the weather event to a user.

17 Claims, 6 Drawing Sheets

(51) Int. Cl.
*G06N 7/01* (2023.01)
*H04W 4/90* (2018.01)

(58) Field of Classification Search
CPC ............... G06F 18/2415; G06V 10/84; G06T 2207/30192; G06T 2207/20076; H04W 4/90; Y10S 706/00
See application file for complete search history.

(56) References Cited

U.S. PATENT DOCUMENTS

| | | | |
|---|---|---|---|
| 7,542,852 B1 | 6/2009 | Rose | |
| 7,949,330 B2 | 5/2011 | Yuhara | |
| 8,280,633 B1* | 10/2012 | Eldering | G06Q 40/08 |
| | | | 702/3 |
| 8,781,989 B2* | 7/2014 | Duchon | G06F 16/35 |
| | | | 706/52 |
| 8,959,168 B2 | 2/2015 | Praun | |
| 9,529,974 B2 | 12/2016 | Li | |
| 10,284,537 B2 | 5/2019 | Liu | |
| 10,706,329 B2 | 7/2020 | Anushiravani | |
| 11,315,046 B1* | 4/2022 | Cook | G06N 20/20 |
| 11,367,053 B2* | 6/2022 | Watson | G06F 18/214 |
| 2005/0187714 A1 | 8/2005 | Brulle-Drews | |
| 2013/0024118 A1* | 1/2013 | Gershunov | G01W 1/10 |
| | | | 702/3 |
| 2013/0085673 A1 | 4/2013 | Cavalcante | |
| 2013/0110399 A1 | 5/2013 | Moss | |
| 2014/0195159 A1* | 7/2014 | Mewes | G01R 21/00 |
| | | | 702/3 |
| 2014/0324352 A1* | 10/2014 | Hamann | G01W 1/10 |
| | | | 702/3 |
| 2014/0371923 A1 | 12/2014 | Weaver | |
| 2016/0196513 A1 | 7/2016 | Mallon | |
| 2017/0131435 A1* | 5/2017 | Peacock | G01W 1/10 |
| 2017/0299772 A1* | 10/2017 | Yuzhakov | G01W 1/10 |
| 2018/0165554 A1 | 6/2018 | Zhang | |
| 2018/0182222 A1 | 6/2018 | Smith | |
| 2018/0218303 A1* | 8/2018 | Cole | G06N 20/00 |
| 2020/0241490 A1 | 7/2020 | Jermann | |
| 2021/0103051 A1* | 4/2021 | Tang | G01S 7/417 |
| 2021/0215848 A1* | 7/2021 | Mukherjee | H04W 4/021 |
| 2021/0271934 A1* | 9/2021 | White | G06V 10/774 |
| 2021/0319313 A1* | 10/2021 | Warren | G06N 3/08 |
| 2021/0357680 A1* | 11/2021 | Chen | G06N 3/047 |
| 2022/0209876 A1* | 6/2022 | Sitaram | G06N 20/20 |
| 2024/0103197 A1* | 3/2024 | Gollnick | G01W 1/10 |

FOREIGN PATENT DOCUMENTS

| | | |
|---|---|---|
| JP | 2018163159 A | 10/2018 |
| KR | 100963849 B1 | 6/2010 |

OTHER PUBLICATIONS

Schultz M. G., Betancourt C., Gong B., Kleinert F., Langguth M., Leufen L. H., Mozaffari A. and Stadtler S. 2021Can deep learning beat numerical weather prediction?Phil. Trans. R. Soc. A.37920200097. (Year: 2021).*

Klemmer, Konstantin & Saha, Sudipan & Kahl, Matthias & Xu, Tianlin & Zhu, Xiao. (2021). Generative modeling of spatio-temporal weather patterns with extreme event conditioning. (Year: 2021).*

D. A. B. Oliveira, J. G. Diaz, B. Zadrozny, C. D. Watson and X. X. Zhu, "Controlling Weather Field Synthesis Using Variational Autoencoders," IGARSS 2022—2022 IEEE International Geoscience and Remote Sensing Symposium, Kuala Lumpur, Malaysia, 2022, pp. 5027-5030. (Year: 2022).*

Davvetas, et al., "Unsupervised Severe Weather Detection Via Joint Representation Learning Over Textual and Weather Data." Published May 14, 20 by ARXIV. 6 pages. https://arxiv.org/abs/2005.07243.

Dee, et al. "The ERA-Interim reanalysis: configuration and performance of the data assimilation system." In Quarterly Journal of the Royal Meteorological Society. 137: pp. 553-597, Apr. 2011. 45 pages.

Hossain, et al., "Forecasting the Weather of Nevada: A Deep Learning Approach." 2015 International Joint Conference on Neural Networks (IJCNN), 2015, pp. 1-6, doi: 10.1109/IJCNN.2015.7280812.

Mell, et al., "The NIST Definition of Cloud Computing," Recommendations of the National Institute of Standards and Technology, U.S. Department of Commerce, Special Publication 800-145, Sep. 2011, 7 pgs.

Michalakes, et al. "The Weather Research and Forecast Model Version 2.0." 11th ECMWF Workshop on Use of High Performance Computing in Meteorology. Oct. 25-29, 2004. 18 pages.

Racah, et al. "ExtremeWeather: A large-scale climate dataset for semi-supervised detection, localization, and understanding of extreme weather events." Published Nov. 25, 2017 by ARXIV. 12 pages. 31st Conference on Neural Information Processing Systems (NIPS 2017), Long Beach, CA, USA. https://arxiv.org/abs/1612.02095.

* cited by examiner

AUTOMATIC WEATHER EVENT IMPACT ESTIMATION

BACKGROUND

The present disclosure relates generally to the field of weather modeling, and more specifically to automatic weather event impact estimation.

Extreme climate events impact different activities and communities, causing substantial economic losses every year. Global warming and climate change make such events more common, and various risk and resilience models need to cope with that to deliver trustworthy responses. The ability to estimate the impact caused by new, unseen climate events is of high value to actors working with risk assessment, productivity, and resilience models related to climate events.

SUMMARY

Embodiments of the present disclosure include a method, computer program product, and system for weather event impact estimation. A processor may receive weather event data. The processor may determine, utilizing an artificial intelligence ("AI") model mapping weather events having weather impacts with a higher likelihood of occurrence proximate to each other in the latent space, a weather impact associated with a weather event. In some embodiments, the AI model may be trained using historical weather event data and historical weather impact data associated with the historical weather event data. The processor may output the weather impact associated with the weather event to a user.

In some embodiments, the processor may output an estimated likelihood of the weather impact.

In some embodiments, the processor may output an estimated likelihood of occurrence of the weather event.

In some embodiments, the AI model may be trained using contextual information. In some embodiments, the processor may select the contextual information associated with generating the AI model.

In some embodiments, the AI model may utilize a variational auto-encoder deep neural network.

In some embodiments, the AI model may map historical weather event data into a probabilistic distribution.

In some embodiments, determining the weather impact associated with the weather event may include interpolating weather impacts of neighboring weather events in the latent space.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of weather modeling, and more specifically to automatic weather event impact estimation. While the present disclosure is not necessarily limited to such applications, various aspects of the disclosure may be appreciated through a discussion of various examples using this context.

Methods of the present disclosure automatically learn a weather data distribution from training data (disregarding a formal description of climate events for each specific location under consideration), estimate, automatically, the likelihood of occurrence in the training process, and map to various weather impact variables.

In some embodiments, a processor may receive weather event data. In some embodiments, the weather event data may include information about a past or future weather event. In some embodiments, the weather event data may include information about conditions that may lead to a weather event. For example, the weather event data may include information regarding an anticipated blizzard or cold temperatures and high humidity that fray lead to a blizzard. In some embodiments, the weather event data may be obtained from weather simulations or weather forecasts.

In some embodiments, the weather event data may include geographic contextual information. For example, the weather data may be for a town located at a particular longitude and latitude. In some embodiments, the weather event data may include contextual information associated with time. For example, contextual information may be provided regarding a date, month, or season for the anticipated weather event. In some embodiments, the weather event data may include other contextual information associated with the weather conditions/event, geographic context, or time. For example, contextual information may include information regarding sensors used to obtain weather condition data, climate variables used to determine weather conditions or events (e.g., temperature, precipitation, wind speeds, etc.), the size of geographical area, the environment and objects in the geographical area (e.g., location of homes or location of factories), data resolution associated with the weather event data, image quality associated with the weather data, noise level associated with the weather data, etc.

In some embodiments, the contextual information may be entered manually or computed automatically. For example, the size of geographic area covered by the weather event data may be entered by a user, or this information may be determined automatically by the processor (e.g., the area demonstrating similar weather impacts because of similar population density is a 4 square kilometer area).

In some embodiments, the weather impacts may be associated with an outcome, result, or change causally linked to the weather event. In some embodiments, the weather impact may be associated with changes or damage to the environment or objects in the environment that are anticipated recipients of the weather event. In some embodiments, the weather impacts may measure the disruption to society resulting from the weather event. In some embodiments, the weather impacts may be monetary amounts (e.g., costs to repair damage or return conditions to a prior state), other resource requirements (e.g., repair time, repair manhours, amounts of specific resources such as snowplows, etc.), specific changes to the state of the environment or objects subject to the weather event (e.g., three feet of coastal erosion), etc.

As an example, an insurance company may desire an estimate for future contracts for covering extreme weather events, and an artificial intelligence model may provide the impact for new, previously unseen weather scenarios. As another example, an urban planner may seek to understand the impact of flooding weather events and the effects of flooding on traffic.

In some embodiments, an artificial intelligence ("AI") model may be trained using historical weather event data and historical weather impact data associated with the historical weather event data to map weather events having weather impacts with a higher likelihood of occurrence proximate to each other in the latent space. In some embodiments the AI model may be used to determine a weather impact associated with a weather event.

In some embodiments, determining the weather impact associated with the weather event may include interpolating weather impacts of neighboring weather events in the latent space. For example, the received weather event data may have an associated (e.g., likely) weather event that lies in proximity to other weather events in the latent space. The weather impacts (e.g., obtained from historical weather impact data associated with historical weather events) of the other weather events in the latent space may be used to ascertain the probable weather impact associated with the weather event.

In some embodiments, the AI model may map a complex data distribution into a known probabilistic distribution that enables mapping historical datasets and corresponding impact values into a metrified latent space. In some embodiments, the metrified latent space may enable estimating new event impacts by interpolating among neighboring samples in the latent space. For example, during the training of the AI model, weather impacts may be mapped to weather event data in a metrified space, with known impacts (e.g., costs) mapped to known weather events so that similar weather events have similar weather impacts (e.g., costs).

In some embodiments, the AI model may map historical weather event data into a probabilistic distribution. In some embodiments, during the training phase, the representations may be mapped to a known normal distribution, with $E=KL[N(\mu,\sigma), N(0,1)]$. In some embodiments, the latent space may be regularized to force the latent space to a known, normal distribution. In some embodiments, the latent space ($\sim N(0,1)$) may be organized by similarity and likelihood of occurrence, with very common events located near the distribution mean and rare events locate far from the distribution mean.

In some embodiments, the AI model may utilize a variational auto-encoder deep neural network. In some embodiments, the variational auto-encoder deep neural network may include an encoder and a decoder. In some embodiments, the encoder may be responsible for creating an efficient data representation. In some embodiments, the decoder may be responsible for obtaining the representation and recreating the input as an output. In some embodiments, the AI model may utilize any other type of neural network that can be used to learn a compressed representation of raw data (e.g., diffusion process models).

In some embodiments, the AI model may be trained utilizing historical weather event data and historical weather impact data associated with the historical weather event data. In some embodiments, during the training process, the error may be computed and backpropagated to update the network weights and find an optimal configuration. In some embodiments, after several iterations, the encoder may be able to generate a compact data representation that holds the relevant information from input climate data. In some embodiments, variational autoencoders may enable organization of the latent space by similarity and extraction of the probability of a given weather event.

In some embodiments, the processor may output the weather impact associated with the weather event to a user. For example, an expected blizzard may cause an estimated $10 million dollar in property damage in a high population density city with older housing that is not designed to withstand high snow fall totals. In some embodiments, the weather impact may be an estimate of damage costs; a prediction of the types of damage that may occur (e.g., roof damage to residential properties); a prediction of the amount of damage that may occur (e.g., roof damage to 4% of the 100,000 properties build before 1920); a prediction of changes to property, the environment, or other objects in the environment that may arise from the weather event (e.g., coastal erosion); etc.

In some embodiments, the processor may output an estimated likelihood of occurrence of the weather event. In some embodiments, the processor may output the likelihood of occurrence for the weather event considering a normal distribution of the historical data for that location. For example, the processor may output that there is a 40% likelihood of a blizzard producing 3 feet of snow in a 24-hour period.

In some embodiments, the processor may output an estimated likelihood of the weather impact. In some embodiments, the likelihood of the weather impact may be obtained from the probability distribution of the historical data for the contextual situation (e.g., location, time of year, etc.). For example, the processor may output that there is a 70% likelihood of at least $10 million in property damage.

In some embodiments, the AI model may be trained using contextual information. In some embodiments, the processor may select the contextual information associated with generating the AI model. For example, the AI model mapping weather events having weather impacts with a higher likelihood of occurrence proximate to each other in the latent space may be associated with a geographic and/or time context. In some embodiments, the probabilistic distribution may be of weather events and impacts associated with a particular town, climate region, longitude and latitude coordinates, month, season, etc. In some embodiments, the probabilistic distribution may be associated with other contextual information such as type of sensor used, attributes of the sensor data, climate variable (e.g., precipitation, temperature, etc.), etc. In some embodiments, a user engaged in weather impact assessment may provide an input to the processor to select one or more contextual variables (e.g., the contextual information) that is used to generate the trained AI model.

Figure 1:
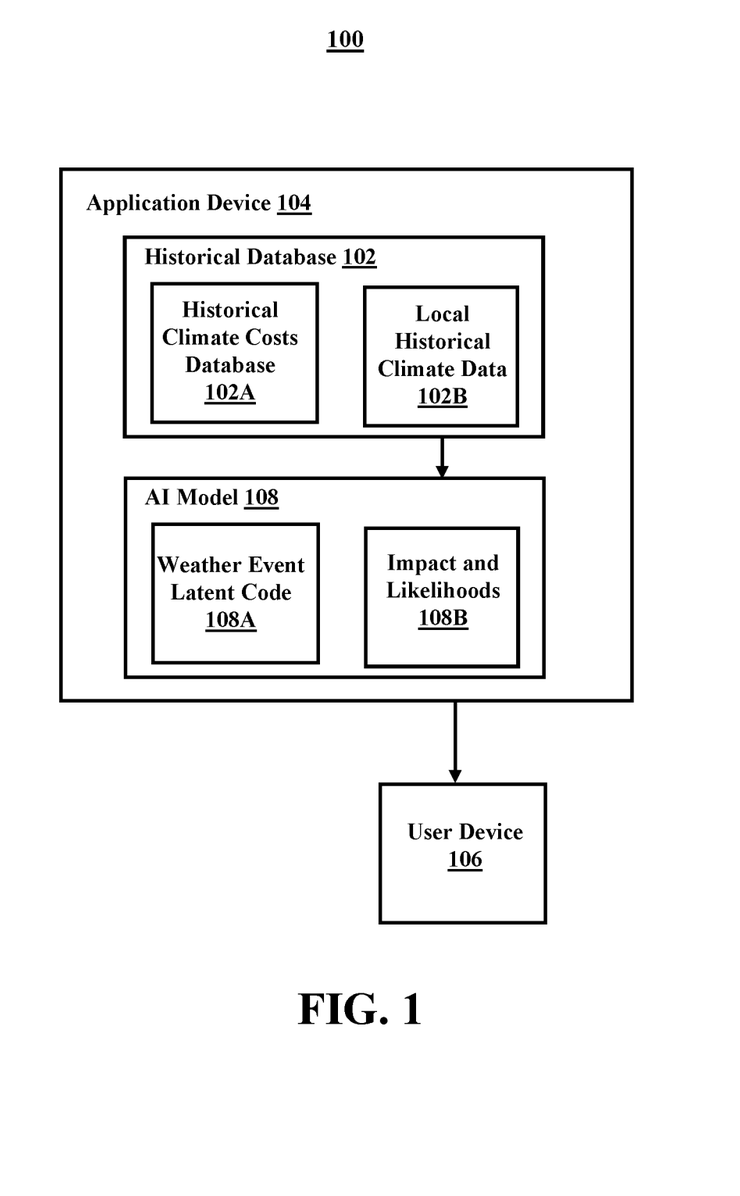
FIG. 1 is a block diagram of an exemplary system for weather event impact estimation, in accordance with aspects of the present disclosure.

Referring now to FIG. 1, a block diagram of a system 100 for weather event impact estimation is illustrated. System 100 includes an application device 104 and user device 106. The user device 106 is configured to be in communication with the application device 104. The application device 104 includes a historical database 102 and an AI model 108. In some embodiments, the user device 106 and the application device 104 may be any devices that contain a processor configured to perform one or more of the functions or steps described in this disclosure.

In some embodiments, the historical database 102 includes a historical climate and costs database 102A from which local historical climate data 102B is obtained. In some embodiments, historical climate and costs data is used along with local historical climate data from the historical database 102 to train the AI model 108.

In some embodiments, the application device 104 may receive weather event data about a new weather event anticipated for a particular geographic area (e.g., the geographic area associated with the local historical climate data 102B). In some embodiments, the weather event may be encoded to the AI model 108. In some embodiments, the weather event latent code 108A may be used to determine the estimated impact, likelihood of the impact, and likelihood of occurrence of the weather event 108B. In some embodiments, the estimated impact, likelihood of the impact, and likelihood of occurrence of the weather event 108B may be communicated to the user device 106. In some embodiments, the real/observed impact of the new weather event may be input to the AI model 108 for generative learning.

Figure 2A:
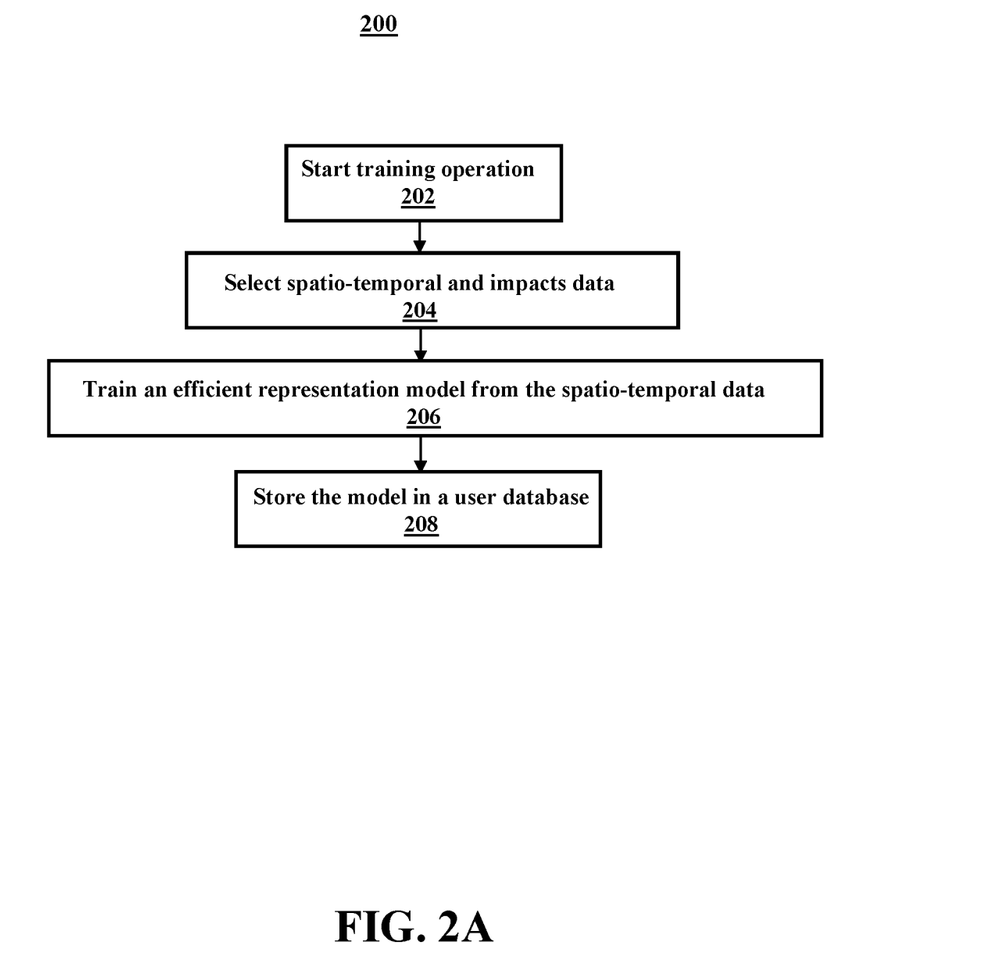
FIG. 2A is a flowchart of an exemplary method for weather event impact estimation, in accordance with aspects of the present disclosure.

Referring now to FIG. 2A, illustrated is a flowchart of an exemplary method 200 for weather event impact estimation, in accordance with embodiments of the present disclosure. In some embodiments, a processor of a system may perform the operations of the method 200. In some embodiments, method 200 begins at operation 202. At operation 202, a user starts the model training operation. In some embodiments, method 200 proceeds to operation 204, where the user selects a set of spatio-temporal samples (e.g., associated with particular geographies and times) for training the model. In some embodiments, method 200 proceeds to operation 206, where the processor trains an efficient representation model from the spatio-temporal data. In some embodiments, the trained model may hold characteristics of the location climate data, including how probable are the extreme events. In some embodiments, the model adapts to the climate observed in the location defined by the user and considering the time window defined by the user. In some embodiments, method 200 proceeds to operation 208, where the processor stores the trained model in a database together with the contextual information (e.g., location and time window) used for training.

As discussed in more detail herein, it is contemplated that some or all of the operations of the method 200 may be performed in alternative orders or may not be performed at all; furthermore, multiple operations may occur at the same time or as an internal part of a larger process.

Figure 2B:
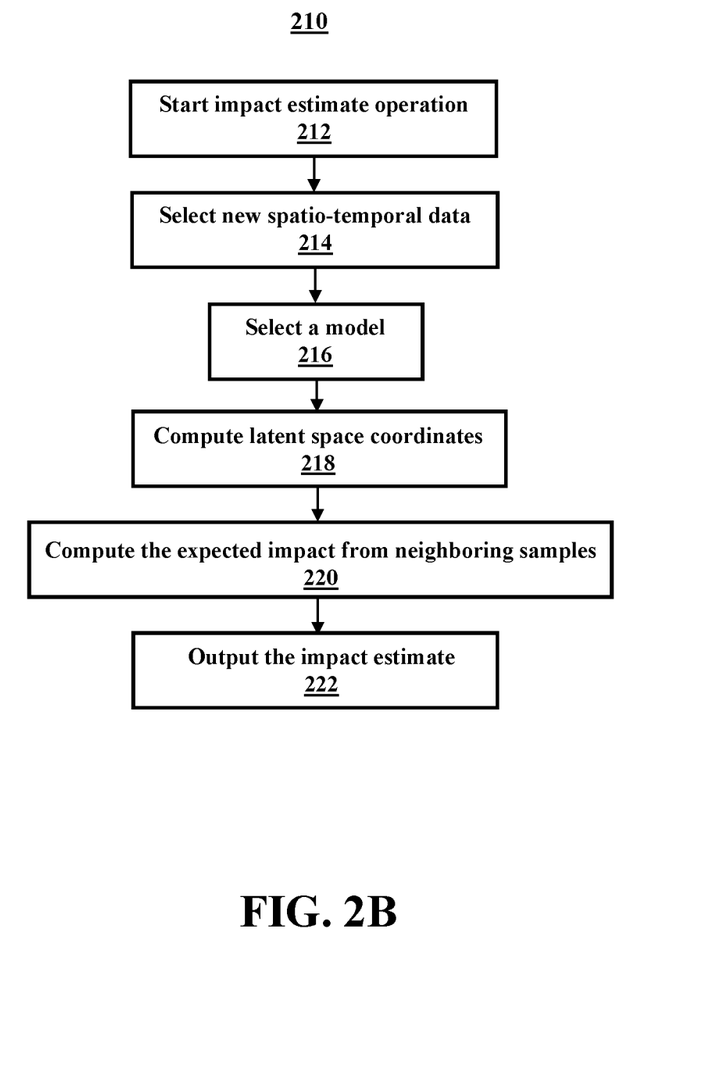
FIG. 2B is a flowchart of an exemplary method for weather event impact estimation, in accordance with aspects of the present disclosure.

Referring now to FIG. 2B, illustrated is a flowchart of an exemplary method 210 for weather event impact estimation, in accordance with embodiments of the present disclosure. In some embodiments, a processor of a system may perform the operations of the method 210. In some embodiments, method 210 begins at operation 212. At operation 212, a user starts the impact estimate operation. In some embodiments, method 210 proceeds to operation 214, where the user selects a new spatio-temporal weather data sample.

In some embodiments, method 210 proceeds to operation 216, where the processor selects a model trained in the location specified or that holds similar contextual information (e.g., if location is not available). In some embodiments, method 210 proceeds to operation 218, where the processor computes the latent representation for the selected weather data sample. In some embodiments, method 210 proceeds to operation 220, where the processor computes the impact estimation as the interpolation of neighboring samples impact mapped in the latent space. In some embodiments, method 210 proceeds to operation 222, where the processor outputs the impact estimate for the selected new sample.

As discussed in more detail herein, it is contemplated that some or all of the operations of the method 210 may be performed in alternative orders or may not be performed at all; furthermore, multiple operations may occur at the same time or as an internal part of a larger process.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
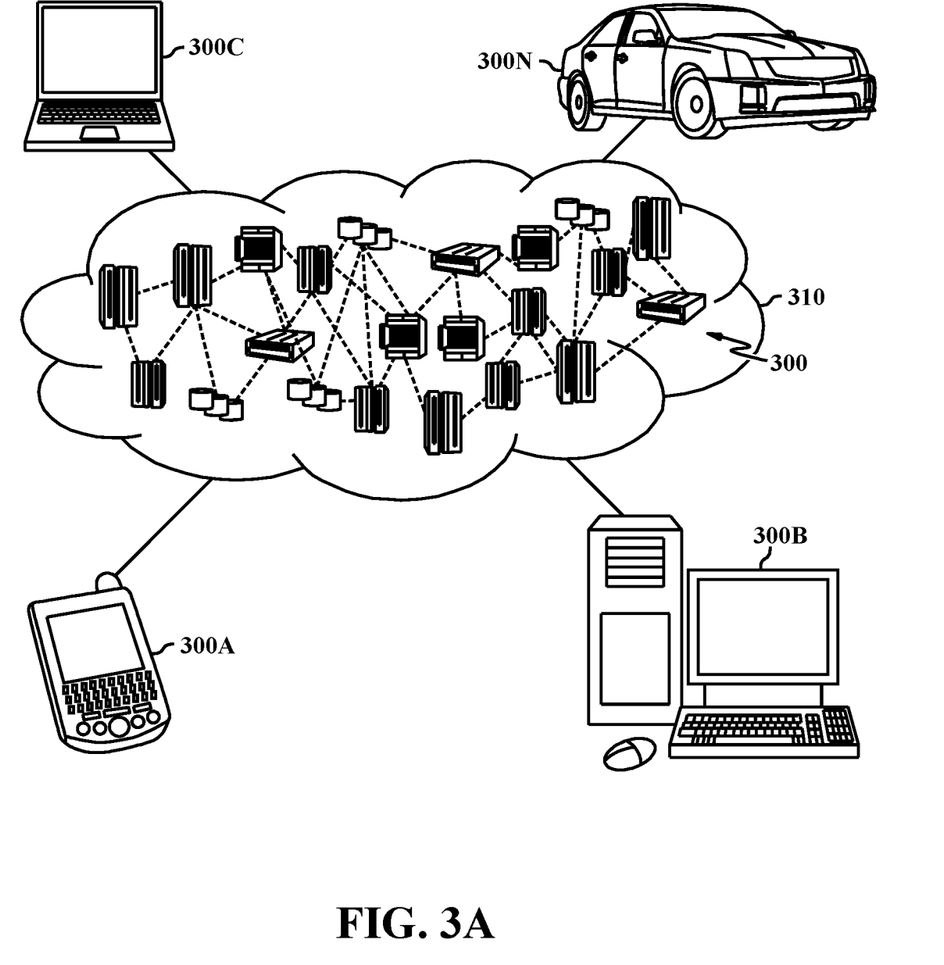
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
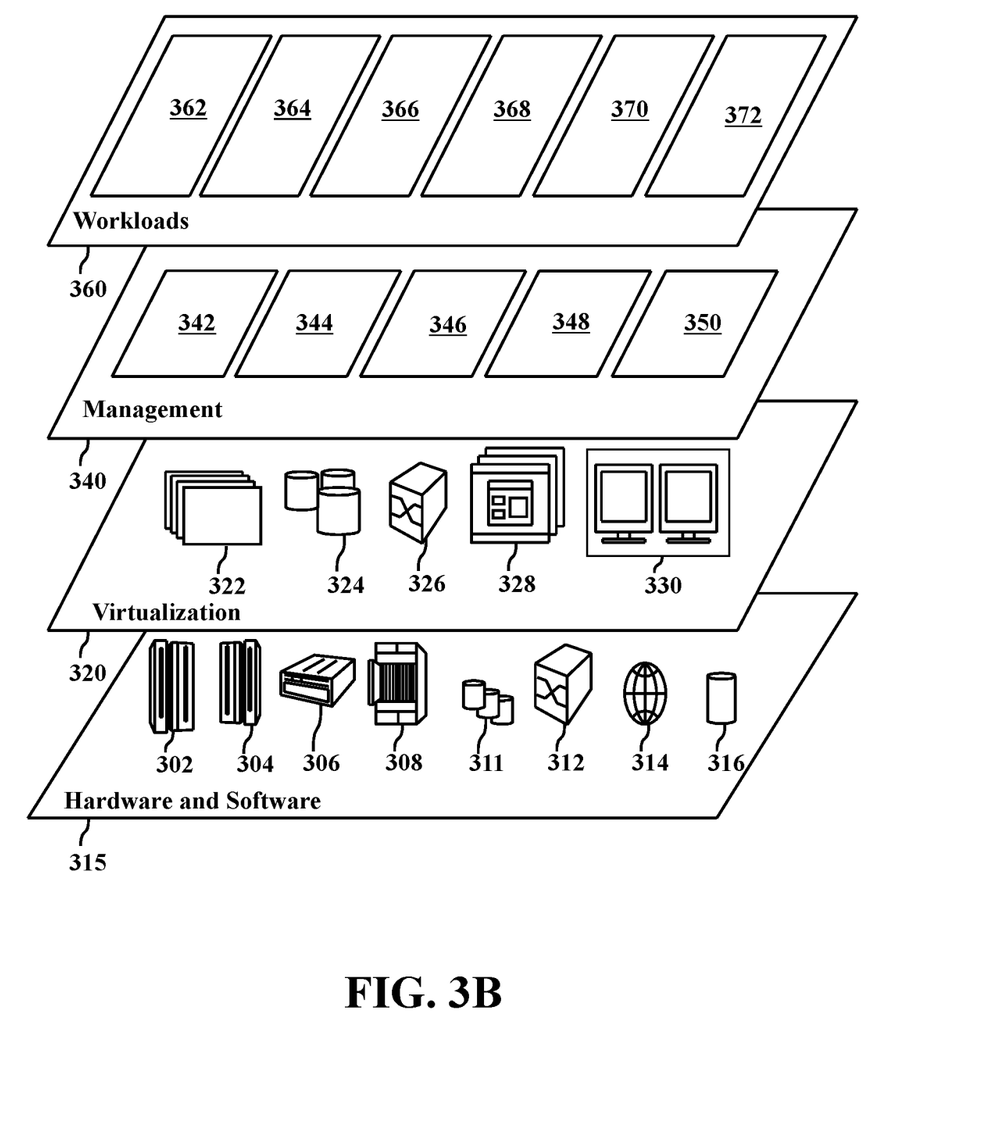
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and classification of genes based on DNA sequence signatures 372.

Figure 4:
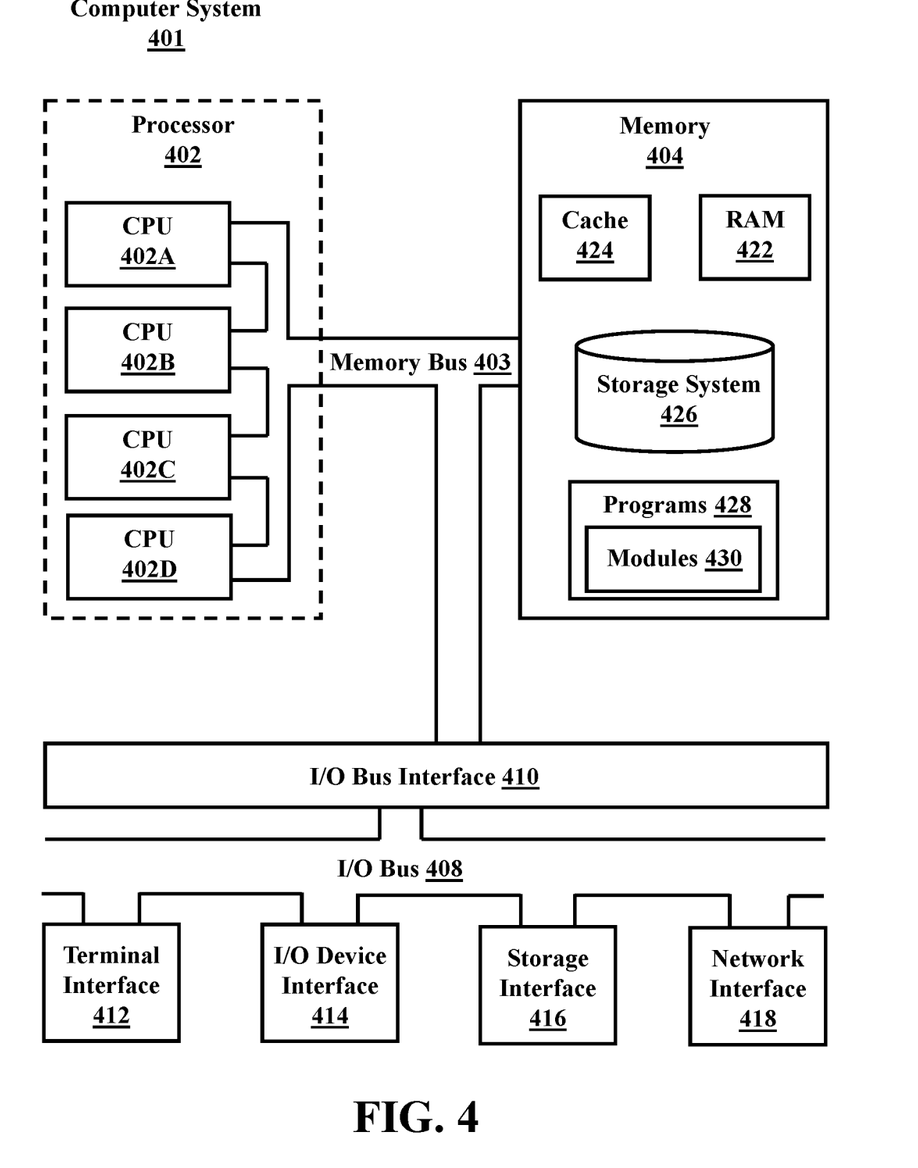
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method, the method comprising:
    receiving, by a processor, data corresponding to a future weather event, wherein a portion of the data is collected using a sensor;
    identifying an artificial intelligence ("AI") model, wherein the AI model has been trained using historical weather event data, historical weather impact data associated with the historical weather event data, and contextual information, wherein the contextual information includes data about the sensor;
    mapping weather events having weather impacts with a higher likelihood of occurrence proximate to each other in a latent space in the context of the artificial intelligence model;
    determining, utilizing the AI model, a weather impact associated with the future weather event; and
    outputting the weather impact associated with the future weather event to a user, wherein the output weather impact comprises an estimate of property damage monetary cost, a prediction of types of property damage resulting from the future weather event, and a repair time;

wherein determining the weather impact associated with the future weather event includes interpolating weather impacts of neighboring weather events in the latent space.

2. The computer-implemented method of claim 1, further comprising:
outputting an estimated likelihood of the weather impact.

3. The computer-implemented method of claim 1, further comprising:
outputting an estimated likelihood of occurrence of the future weather event.

4. The computer-implemented method of claim 1, the method further comprising:
selecting a portion of contextual information associated with generating the AI model.

5. The computer-implemented method of claim 1, wherein the AI model utilizes a variational auto-encoder neural network.

6. The computer-implemented method of claim 1, wherein the AI model maps historical weather event data into a probabilistic distribution.

7. A system comprising:
a memory; and
a processor in communication with the memory, the processor being configured to perform operations comprising:
receiving, by a processor, data corresponding to a future weather event, wherein a portion of the data is collected using a sensor;
identifying an artificial intelligence ("AI") model, wherein the AI model has been trained using historical weather event data, historical weather impact data associated with the historical weather event data, and contextual information, wherein the contextual information includes data about the sensor;
mapping weather events having weather impacts with a higher likelihood of occurrence proximate to each other in a latent space in the context of the artificial intelligence model;
determining, utilizing the AI model, a weather impact associated with the future weather event; and
outputting the weather impact associated with the future weather event to a user, wherein the output weather impact comprises an estimate of property damage monetary cost, a prediction of types of property damage resulting from the future weather event, and a repair time;
wherein determining the weather impact associated with the weather event includes interpolating weather impacts of neighboring weather events in the latent space.

8. The system of claim 7, the processor being configured to perform operations comprising:
outputting an estimated likelihood of the weather impact.

9. The system of claim 7, the processor being configured to perform operations comprising:
outputting an estimated likelihood of occurrence of the future weather event.

10. The system of claim 7, wherein the processor is further configured to perform operations comprising:
selecting a portion of contextual information associated with generating the AI model.

11. The system of claim 7, wherein the AI model utilizes a variational auto-encoder neural network.

12. The system of claim 7, wherein the AI model maps historical weather event data into a probabilistic distribution.

13. A computer program product comprising a computer readable storage medium having program instructions embodied therewith, the program instructions executable by a processor to cause the processor to perform operations, the operations comprising:
receiving, by a processor, data corresponding to a future weather event, wherein a portion of the data is collected using a sensor;
identifying an artificial intelligence ("AI") model, wherein the AI model has been trained using historical weather event data, historical weather impact data associated with the historical weather event data, and contextual information, wherein the contextual information includes data about the sensor;
mapping weather events having weather impacts with a higher likelihood of occurrence proximate to each other in a latent space in the context of the artificial intelligence model;
determining, utilizing the AI model, a weather impact associated with the future weather event; and
outputting the weather impact associated with the future weather event to a user, wherein the output weather impact comprises an estimate of property damage monetary cost, a prediction of types of property damage resulting from the future weather event, and a repair time;
wherein determining the weather impact associated with the weather event includes interpolating weather impacts of neighboring weather events in the latent space.

14. The computer program product of claim 13, the processor being configured to perform operations comprising:
outputting an estimated likelihood of the weather impact.

15. The computer program product of claim 13, the processor being configured to perform operations comprising:
outputting an estimated likelihood of occurrence of the future weather event.

16. The computer program product of claim 13, the processor being configured to perform operations comprising:
selecting a portion of contextual information associated with generating the AI model.

17. The computer program product of claim 13, wherein the AI model maps historical weather event data into a probabilistic distribution.

* * * * *